J. A. DOBMEIER.
TENDER FOR TRACTION ENGINES.
APPLICATION FILED MAR. 25, 1911.
1,051,202.
Patented Jan. 21, 1913.
3 SHEETS—SHEET 2.
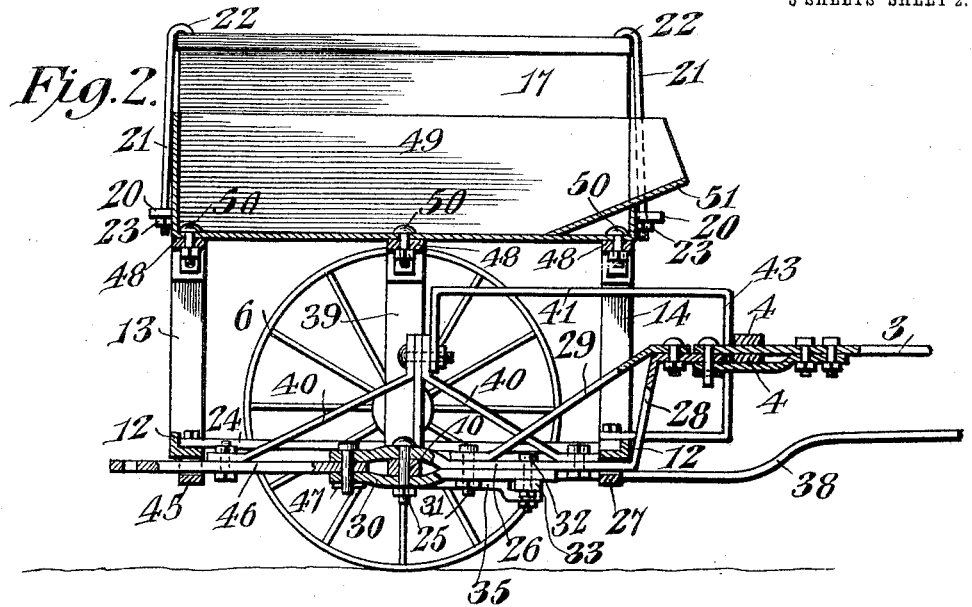
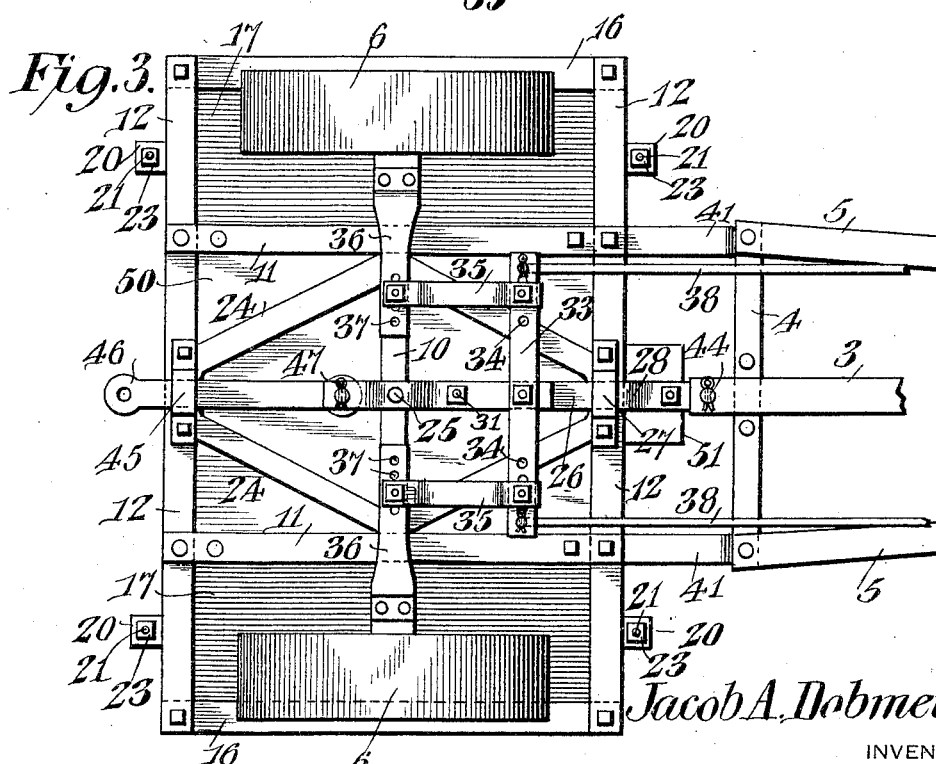
WITNESSES
Jas. K. McCathran
F. T. Chapman.
Jacob A. Dobmeier
INVENTOR
ATTORNEY

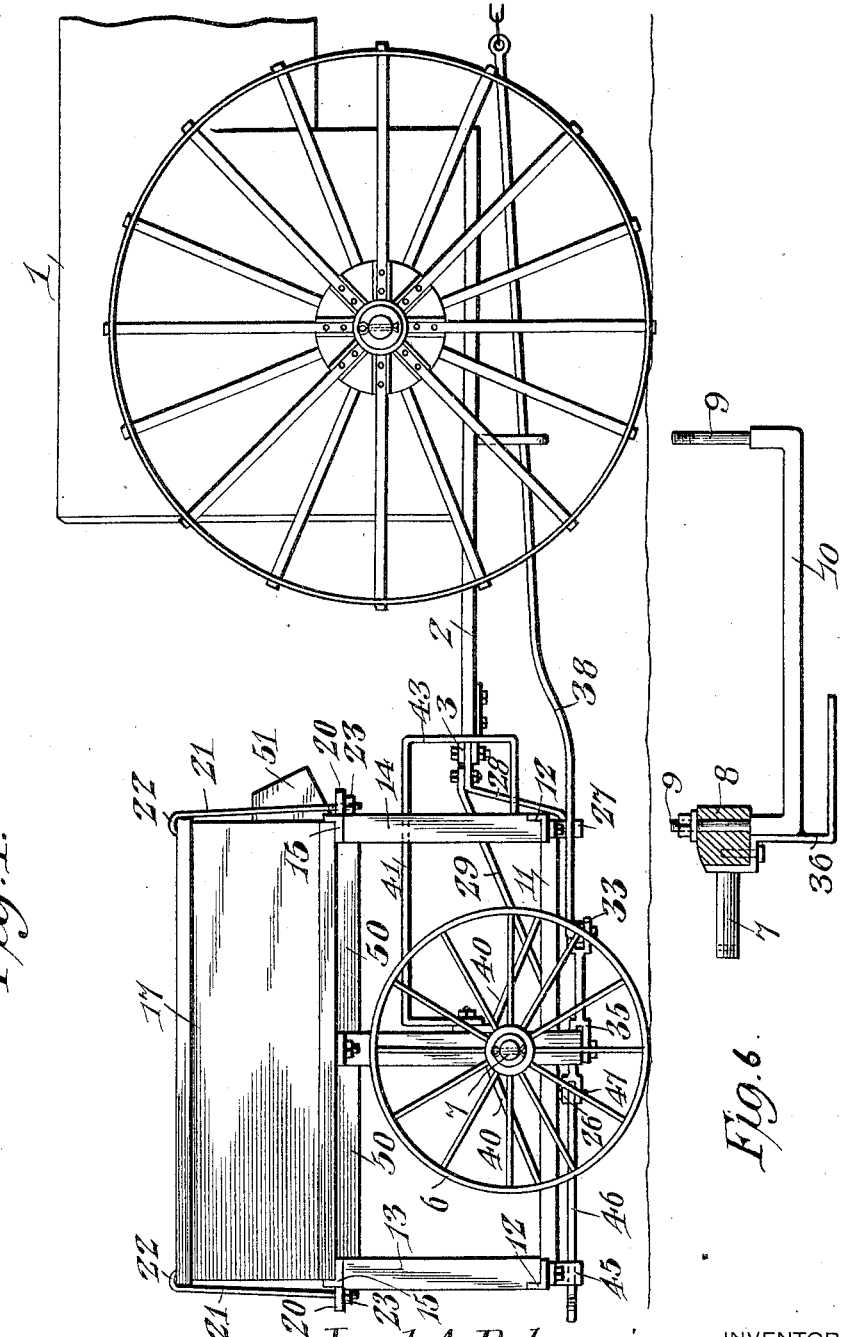

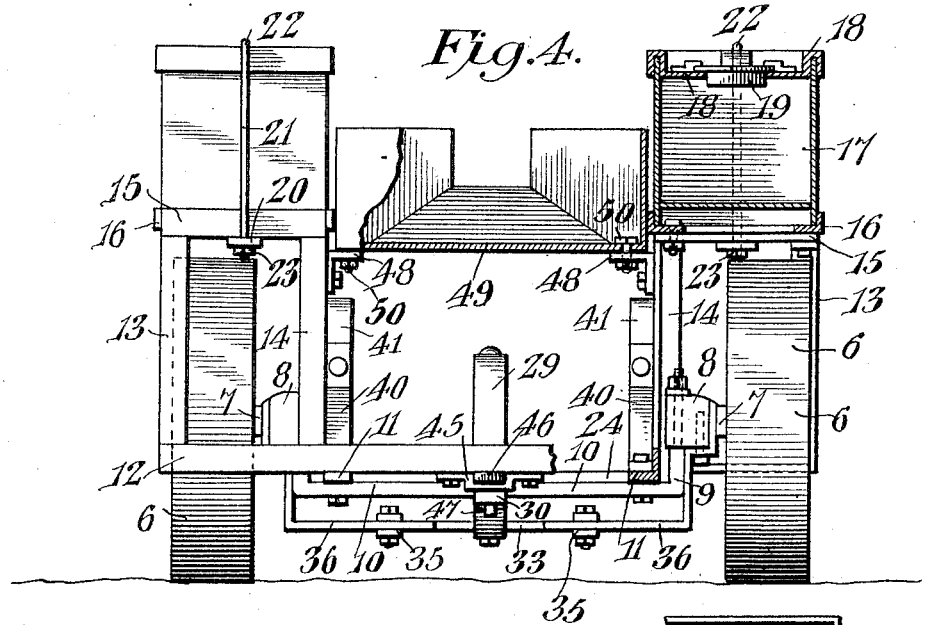

UNITED STATES PATENT OFFICE.

JACOB A. DOBMEIER, OF PARK RIVER, NORTH DAKOTA.

TENDER FOR TRACTION-ENGINES.

1,051,202. Specification of Letters Patent. Patented Jan. 21, 1913.

Application filed March 25, 1911. Serial No. 616,936.

*To all whom it may concern:*

Be it known that I, JACOB A. DOBMEIER, a citizen of the United States, residing at Park River, in the county of Walsh and State of North Dakota, have invented a new and useful Tender for Traction-Engines, of which the following is a specification.

This invention has reference to improvements in self-steering tenders for traction engines, and its object is to produce a device of large capacity which may be used for transporting various kinds of fuel and may be readily adapted to different makes of traction engines.

In accordance with the present invention, which is an improvement upon the structure shown in Letters-Patent No. 886,059, granted to Martin Jorstad on April 28, 1908, for a tender for traction engines, there is provided a truck frame supported upon two wheels, each of which is mounted upon a stub axle capable of turning about an axis at right angles to the axis of rotation of the wheel, and these wheels may be so connected to the steering gear of a traction engine as to turn therewith to participate in any turning movements of the engine. The tender is provided with water tanks in overriding relation to the tender wheels and spaced apart so as to accommodate a coal pan or receptacle between them, and the parts may be so proportioned that the person firing the engine may stand upon the platform of the engine and have ready access to coal within the coal receptacle. Furthermore, provision is made for keeping the tender in substantially fixed relation to the rear of the engine, so that it will not swing from side to side as the engine progresses.

The invention will be best understood from a consideration of the following detailed description, taken in connection with the accompanying drawings forming a part of this specification, with the understanding, however, that while the showing of the drawings is that of a practical embodiment of the invention, other forms of the invention are possible, while still retaining the salient features of the invention.

In the drawings:—Figure 1 is a side elevation of the tender and the rear portion of a traction engine showing the connection between the two. Fig. 2 is a central longitudinal vertical section of the tender with some parts shown in elevation and showing a portion of the connections to the traction engine. Fig. 3 is a bottom plan view of the structure shown in Fig. 2. Fig. 4 is a rear elevation of the tender with some parts broken away and shown in vertical cross section. Fig. 5 is a top plan view of the delivery end of the coal receptacle. Fig. 6 is an elevation with parts in section of the main axle and one of the stub axles carried thereby.

Referring to the drawings, there is shown a traction engine 1, which showing is more or less indicative without attempt to illustrate any particular type of traction engine, and it may, therefore, be taken as illustrating any suitable type of traction engine, and the platform of the engine upon which the fireman or other person usually stands is indicated at 2 in Fig. 1, while only a draft bar 3, cross bar 4 and side bars 5 of a framework which may be utilized to support the standing platform constituting the platform 2 are indicated in Figs. 2 and 3.

The tender is provided with two wheels 6, 6, each mounted on a stub axle 7, which axle projects from a block 8 mounted on the respective upturned end 9 of a drop axle 10 extending crosswise of the tender about midway of its normal length.

The drop axle 10 is fast to two spaced longitudinal beams 11 which may be made of angle steel, and at the ends these longitudinal members 11 are connected by cross bars 12 which may, also, be made of angle steel. The cross bars 12 extend laterally beyond the longitudinal bars 11 and at their outer ends carry uprights 13 matching other uprights 14 rising from the point of junction of the cross bars 12 with the longitudinal bars 11. Those ends of the uprights 13 and 14 remote from the bars 11 and 12 are connected by cross bars 15 and longitudinal bars 16, all of the several members constituting a framework and are preferably, though not necessarily, made of angle metal. The bars 15 and 16 are so disposed that an angle web of each stands upright and the several upright webs are so spaced as to receive between them a tank 17 preferably of elongated rectangular form with a cover 18 provided with a filling opening normally closed by a plug 19. The uprights 13 and 14 are so disposed that the tanks 17 are in overriding relation to respective wheels 6. In order that the tanks 17 may be held in place against accidental displacement, the end bars 15 are each provided with an ear 20 traversed by a hook bolt 21 having a hook end 22 in position to engage over the corresponding end of the cover 18, which latter may be provided with a peripheral flange and the other end of the bolt has applied thereto a nut 23 after this bolt has been passed through the ear 20, so that the hook 22 may be brought into holding relation to the tank to maintain it in its seat in the bars 15 and 16.

The frame of the tender is stiffened by braces 24 extending from about the point of connection of the axle 10 with the longitudinal beams 11 to the cross beams 12 about midway of the length of the latter, the parts being connected together by rivets or otherwise.

Connected to the middle portion of the axle 10 by a bolt 25 is a draft bar 26 extended toward the front of the tender beneath the middle portion of the corresponding cross beam 12, this draft bar being held to the cross beam by a clip or yoke 27 and to the front of this cross beam 12 the draft bar is bent upwardly and then forwardly, as indicated at 28, the several definitions of direction being with reference to the normal position of the tender when in use. The upturned end 28 of the draft bar is connected by a brace 29 to the draft bar close to the axle 10. The rear end of the draft bar is carried beyond the axle, and in embracing relation to the axle there is another bar 30 connected to the axle by the bolt 25 and to the draft bar in front of the axle by another bolt 31, which may be also utilized for connecting the brace 29 to the draft bar. The bar 30 extends toward the front of the frame of the tender for an appropriate distance and the front end of this bar 30 is traversed by a bolt 32 which also extends through the corresponding portion of the draft bar 26. The bolt 32 serves as a pivot support for a rock lever 33 extending transversely of the frame of the traction engine and having arms of equal length at the ends of which are longitudinal series of perforations 34 for the connection thereto of links 35, one link at each end of the lever, and these links 35 are in turn connected to arms 36 fast to the blocks 8, being appropriately bent to have sufficient drop to underride the axle 10. These arms 36 are each provided with a longitudinal series of perforations 37 by means of which the corresponding ends of the links 35 are connected to the arms 36 in any desired position of adjustment. The arms of the lever 33 are normally extended beyond the links 35 and have there connected to them rods 38 extending to the steering mechanism of the traction engine, as is customary in structures of this character, and for this reason it is not deemed necessary to show such steering mechanism. It will be understood that when the steering mechanism of the traction engine is operated the motion of the steering wheels or steering axle of the traction engine will be imparted to the rods 38 and by the latter to the lever 33 and in turn through the links 35 to the arms 36, so that the wheels 6 may be turned upon substantially vertical axes to change their general relation to the tender, so as to follow any curved path in which the traction engine may travel. Generally considered, the steering mechanism for the tender is substantially like that shown in the aforesaid Letters-Patent.

There are intermediate uprights 39 secured to the junction points of the axle 10 and longitudinal bars 11, and these uprights are stiffened by braces 40 extending from one of the flanges of each upright to the corresponding longitudinal bar 11 near its point of connection with the cross bars 12. Secured to the uprights 39 are bumper strips 41 carried forward beyond the front of the frame of the tender and then turned on themselves and each secured by a suitable bolt 42 or otherwise to the front cross beam 12. These bumpers are provided with a forward section 43 of sufficient vertical extent when in operation to accommodate traction engines of different heights and the two bumper bars 41 are appropriately spaced apart to engage the cross beam 4 of the platform frame of the traction engine or other fixed points of the traction engine, so that when the draft beam 3 of the engine is made fast to the front end 28 of the draft bar 26, as by a pin 44, the bumpers 41 will hold the tender in proper relation to the engine, so that it will not swing around when being dragged over a surface by the engine and will hold its place when the engine is backing.

The rear cross bar 12 is provided with a yoke or bracket 45 on its under side for the passage of a link 46 which may be made fast between the rear ends of the draft bar 26 and bar 30 by a pin 47 or otherwise so that any desired machinery may be attached to the engine back of the tender and still be in direct communication with the draft bar of the engine, whereby the tender is not under any strain due to the presence of any loads back of said tender.

The uprights 14 at the front and the uprights 13 at the rear of the tender frame and also the intermediate uprights 39 have fast to them near their upper ends brackets 48 encroaching a short distance on the space between the tanks 17, and these brackets are designed to receive a coal box or receptacle 49 secured to the brackets by bolts 50. This coal box or receptacle is formed at the front end, that is the end toward the engine, with an inclined mouth portion 51 contracted to a comparatively narrow exit about on a level with the fuel door of the engine, so that a fireman or other operator may readily shovel coal from the coal box into the fire chamber of the engine. With the coal box removed, which may be readily done by taking out the bolts 50, ample space remains between the uprights 14 for the accommodation of wood when the latter is used as a fuel.

The employment of the drop axle 10 permits the use of larger wheels for the tender than would be the case were the axles for the wheels on a level with the bottom of the tender frame or substantially so. The use, therefore, of comparatively large wheels does not interfere with lowering the flooring of the tender comparatively close to the ground, so that the fireman or other attendant may readily pitch fuel into the fire chamber of the traction engine.

It will be understood, of course, that the drawings show the framework only of the tender and no attempt is made to show flooring or other means for preventing accidental escape of fuel from the tender. While the tender of the present invention is useful in connection with traction engines when used for threshing, it is equally useful in connection with traction engines when used for plowing and other purposes.

What is claimed is:—

1. A traction engine tender provided with a drop axle and wheels on the ends thereof, a floor frame below the level of the axis of the wheels, a draft bar at the forward end of the floor frame and elevated above the level of the floor frame at its forward end, and bumpers located above the floor frame and elongated in the direction of the height of the tender and extending both above and below the coupling end of the draft bar, said bumpers being in fixed relation to the tender and each provided at both the top and bottom with rearwardly extending supporting means.

2. A traction engine tender provided with supporting wheels and a floor frame at a lower level than the axis of the wheels, and spaced bumpers above the floor frame at the forward end thereof and elongated in the direction of the height of the tender to a greater extent than the parts to be engaged by the bumpers, said bumpers being in fixed relation to the tender and each provided with supports spaced apart in the direction of the height of the bumper.

3. A traction engine tender having a floor frame composed of joined longitudinal and cross bars, the longitudinal bars being located on opposite sides of the center line of the tender frame in spaced relation one to the other, end and intermediate uprights on the longitudinal bars, braces connected to the intermediate uprights and to the longitudinal bars, and bumper strips connected to each intermediate upright and to a front cross bar of the tender, said strips being returned on themselves at the active end and projecting beyond the front of the tender and extended in the direction of the height of the tender to a greater degree than the parts to be engaged thereby.

4. A traction engine tender having a floor frame composed of joined longitudinal and cross bars, the longitudinal bars being located on opposite sides of the center line of the tender frame in spaced relation one to the other, end and intermediate uprights on the longitudinal bars, braces connected to the intermediate uprights and to the longitudinal bars, and bumper strips connected to each intermediate upright and to a front cross bar of the tender, said strips being returned on themselves at the active end and projecting beyond the front of the tender and extended in the direction of the height of the tender to a greater degree than the parts to be engaged thereby, the said tender being provided with a central draft bar elevated at the front end to a point about intermediate of the height of the bumpers.

5. A traction engine tender having a floor frame, uprights on opposite sides of and spaced from the center line of the floor frame, connecting members for the uprights on the same side of the said center line and connecting those ends of the uprights remote from the floor frame, said connecting members being formed of angle material with upstanding flanges, tanks adapted to seat on the connecting members within the spaces defined by the flanges and in spaced relation one to the other to leave an intermediate clear space between the tanks, and means for holding the tanks against displacement.

6. A traction engine tender having a floor frame, uprights on opposite sides of and spaced from the center line of the floor frame, connecting members for the uprights on the same side of the said center line connecting those ends of the uprights remote from the floor frame, said connecting members being formed of angle material with upstanding flanges, tanks adapted to seat on the connecting members within the spaces defined by the flanges, and spaced relative one to the other to leave an intermediate clear space between the tanks, means for holding the tanks against displacement, and supporting wheels for the tender each in underriding relation to a respective tank.

7. A traction engine tender provided with a floor frame comprising longitudinal and cross bars joined together with the cross bars extending laterally beyond the longitudinal bars, uprights joined to the frame at the crossing points of the longitudinal and cross bars and also at the outer ends of the cross bars, connecting bars at the ends of the uprights remote from the floor frame of the tender, tanks carried by the connecting members, adjustable wheels carrying the tender frame and located beneath the tanks, means for adjusting the wheels to different angular positions with relation to the center line of the tender, a draft bar for the tender elevated at the front above the floor line of the tender, and bumpers at opposite sides of the center line of the tender and substantially coincident with the longitudinal bars, said bumpers being extended both above and below the coupling end of the draft bar.

8. A traction engine tender provided with a floor frame comprising longitudinal and cross bars joined together with the cross bars extending laterally beyond the longitudinal bars, uprights joined to the frame at the crossing points of the longitudinal and cross bars and also at the outer ends of the cross bars, connecting bars at the ends of the uprights remote from the floor frame of the tender, tanks carried by the connecting members, adjustable wheels carrying the tender frame and located beneath the tanks, means for adjusting the wheels to different angular positions with relation to the center line of the tender, a draft bar for the tender elevated at the front above the floor line of the tender, and bumpers at opposite sides of the center line of the tender and substantially coincident with the longitudinal bars, said bumpers being extended both above and below the coupling end of the draft bar.

In testimony, that I claim the foregoing as my own, I have hereto affixed my signature in the presence of two witnesses.

JACOB A. DOBMEIER.

Witnesses:
 PETER HEISER,
 WILLIAM KENNEY.

---

Copies of this patent may be obtained for five cents each, by addressing the "Commissioner of Patents, Washington, D. C."